US012334327B2

(12) United States Patent
Sugiyama et al.

(10) Patent No.: US 12,334,327 B2
(45) Date of Patent: Jun. 17, 2025

(54) MASS SPECTROMETRY DEVICE CONTROL METHOD, MASS SPECTROMETRY SYSTEM, AND VOLTAGE CONTROL DEVICE

(71) Applicant: Hitachi High-Tech Corporation, Tokyo (JP)

(72) Inventors: Masuyuki Sugiyama, Tokyo (JP); Hideki Hasegawa, Tokyo (JP); Yuki Nagaya, Tokyo (JP); Yuichiro Hashimoto, Tokyo (JP); Hiroyuki Yasuda, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 375 days.

(21) Appl. No.: 17/922,755

(22) PCT Filed: Mar. 23, 2021

(86) PCT No.: PCT/JP2021/012039
§ 371 (c)(1),
(2) Date: Nov. 1, 2022

(87) PCT Pub. No.: WO2021/220671
PCT Pub. Date: Nov. 4, 2021

(65) Prior Publication Data

US 2023/0170198 A1 Jun. 1, 2023

(30) Foreign Application Priority Data

Apr. 28, 2020 (JP) ................................ 2020-079604

(51) Int. Cl.
*H01J 49/02* (2006.01)
*H01J 49/06* (2006.01)
*H01J 49/42* (2006.01)

(52) U.S. Cl.
CPC .......... *H01J 49/022* (2013.01); *H01J 49/062* (2013.01); *H01J 49/4215* (2013.01)

(58) Field of Classification Search
USPC .......................................................... 250/281
See application file for complete search history.

(56) References Cited

U.S. PATENT DOCUMENTS 5,847,386 A 12/1998 Thomson et al.
9,209,006 B2 12/2015 Kalinitchenko
(Continued)

FOREIGN PATENT DOCUMENTS

JP 2014532965 A 12/2014
JP 2018125060 A 8/2018

OTHER PUBLICATIONS

International Search Report and Written Opinion issued for PCT JP/2021/012039, mailed Jun. 22, 2021. (10 pages).

*Primary Examiner* — Kiet T Nguyen
(74) *Attorney, Agent, or Firm* — Volpe Koenig

(57) ABSTRACT

A mass spectrometer includes an ion source, an ion guide, a quadrupole mass filter, a detector, DC and RF power sources, and a voltage control device for controlling an acceleration voltage by controlling the power source. The voltage controller controls the acceleration voltage such that it is increased as the mass-to-charge ratio of ions to be measured is increased within a control region. The control region is surrounded, having one coordinate axis representing the mass-to-charge ratio of the ions passing the ion guide and another axis representing the acceleration voltage applied to the ion guide, by a line representing a lower limit of a stable region where the ions pass the ion guide stably, a line representing an ion mobility of the ions, an upper side
(Continued)

representing an upper limit of the acceleration voltage, and a lower side representing a value at which the acceleration voltage is zero.

8 Claims, 20 Drawing Sheets

(56) References Cited

U.S. PATENT DOCUMENTS

2014/0312243 A1 10/2014 Kalinitchenko
2016/0181084 A1 * 6/2016 Smith .................. H01J 49/426
250/282

* cited by examiner

MASS SPECTROMETRY DEVICE CONTROL METHOD, MASS SPECTROMETRY SYSTEM, AND VOLTAGE CONTROL DEVICE

TECHNICAL FIELD

The present invention relates to a control method for a mass spectrometer, a mass spectrometry system, and a voltage control device.

BACKGROUND ART

A typical mass spectrometer generates ions from an ion source under atmospheric pressure and separates the generated ions according to their mass-to-charge ratio (m/z) with a quadrupole mass filter or the like in vacuum. To cause the ions generated under atmospheric pressure to converge and to efficiently introduce the ions into the quadrupole mass filter in vacuum, an ion optical system such as an ion guide is used. In particular, a multipole ion guide is widely used in mass spectrometers that use a quadrupole mass filter for mass separation of ions. The multipole ion guide is highly effective in causing ions to converge and is inexpensive because it can share a high frequency voltage with the quadrupole mass filter.

PTL 1 discloses a method for accelerating ions by forming an electric field on a center axis of a multipole ion guide. PTL 1 discloses that the time required for ions to pass the ion guide is shortened by accelerating ions in the axial electric field.

CITATION LIST

Patent Literature

PTL 1: U.S. Pat. No. 5,847,386 A

SUMMARY OF INVENTION

Technical Problem

The m/z range of ions that stably can pass the multipole ion guide is determined depending on the high frequency voltage to apply. When the high frequency voltage is shared with the quadrupole mass filter, setting is made so that the sample ions to be measured by the mass spectrometer efficiently pass the ion guide. Ions having a large difference in the m/z as compared to the sample ions to be measured by the mass spectrometer cannot stably pass the ion guide and are ejected from the inside of the ion guide. Thus, when the m/z of the sample ions to be measured by the mass spectrometer is changed, ions are not observed in the time until the sample ions generated by the ion source pass the ion guide and reach the quadrupole mass filter, which results in a problem of low sensitivity.

In the method disclosed in PTL 1, the time required for ions to pass the ion guide is shortened by accelerating the ions in the axial electric field. This makes it possible to prevent the sensitivity from decreasing when the m/z of sample ions to be measured by the mass spectrometer is changed. However, the configuration in which an electrode is inserted between ion guide rod electrodes of the ion guide has a problem in that when the electrode inserted between the ion guide rod electrodes is contaminated, the sensitivity greatly decreases due to charge up. In a configuration in which an ion guide rod electrode is inclined or a configuration in which a tapered rod electrode is used, a quadrupole electrostatic voltage is applied in the radial direction of the ion guide by the voltage applied to form the axial electric field. This causes a problem in that the m/z range of the ions that can pass the ion guide is limited.

The present invention has been made in view of such a background, and an object of the present invention is to perform efficient mass spectrometry.

Solution to Problem

To solve the problems described above, the present invention includes: a mass spectrometer including an ion source configured to generate ions, an ion guide disposed downstream of the ion source and configured to cause the ions to converge, a mass filter disposed downstream of the ion guide and configured to separate, according to a mass-to-charge ratio, the ions having been caused to converge by the ion guide, and a detector disposed downstream of the mass filter and configured to detect the ions having been separated by the mass filter; a power source configured to apply an AC voltage at least to the ion guide, the AC voltage being offset by a DC voltage; and a voltage controller configured to control an acceleration voltage by controlling the power source, the acceleration voltage being the DC voltage. The voltage controller is configured to control the acceleration voltage so that the acceleration voltage is increased as the mass-to-charge ratio of the ions to be measured is increased within a control region. The control region is surrounded, in a coordinate having one coordinate axis representing the mass-to-charge ratio of the ions passing the ion guide and another coordinate axis representing the acceleration voltage applied to the ion guide, by a lower limit value of a stable region where the ions pass the ion guide stably, an ion mobility of the ions, an upper limit value of the acceleration voltage, and a value where the acceleration voltage is zero.

Other solutions will be appropriately described in the embodiments.

Advantageous Effects of Invention

According to the present invention, efficient mass spectrometry can be performed.

DESCRIPTION OF EMBODIMENTS

Next, modes for carrying out the present invention (referred to as "embodiments") will be described in detail with reference to the drawings as appropriate.

First Embodiment

<Mass Spectrometer 100>

Figure 1:
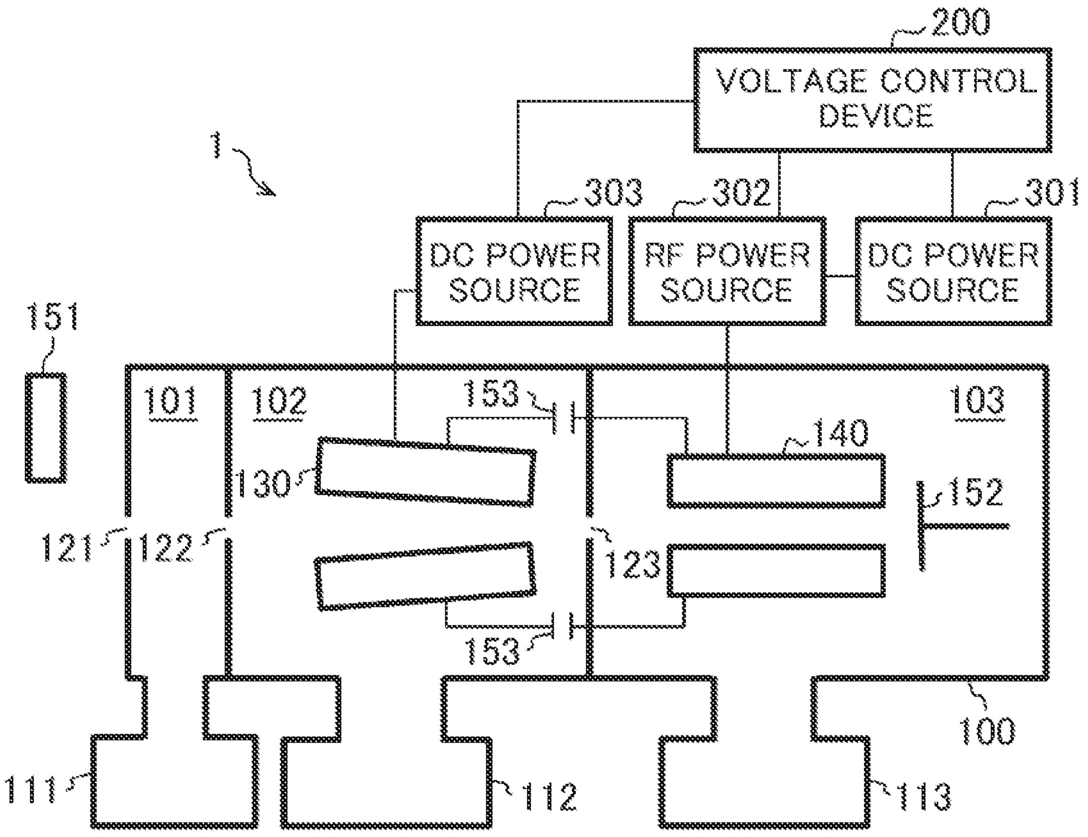
FIG. 1 is a configuration diagram of a mass spectrometry system according to the first embodiment.

FIG. 1 is a configuration diagram of a mass spectrometry system 1 according to the first embodiment.

The mass spectrometry system 1 includes a mass spectrometer 100, a voltage control device 200, DC power sources 301, 303, and an RF power source 302.

In the mass spectrometer 100, ions generated from an ion source 151 are introduced into a first differential evacuation unit 101 via an aperture 121. The ion source 151 operates in atmospheric pressure or in low vacuum. Examples of the ion source include an electrospray ion source, an atmospheric pressure chemical ion source, an atmospheric pressure photoionization source, and an atmospheric pressure matrix-assisted laser desorption % ionization ion source.

The first differential evacuation unit 101 is evacuated by a pump 11 and is maintained at a vacuum of 10 Pa to 500 Pa. The ions having passed the first differential evacuation unit 101 are introduced into a second differential evacuation unit 102 via an aperture 122. The second differential evacuation unit 102 is evacuated by a pump 112 and is maintained at a vacuum of 0.1 Pa to 10 Pa. In the second differential evacuation unit 102, an ion guide 130 that causes the ions to converge is installed.

Droplets and contaminants in the atmosphere flow into the second differential evacuation unit 102 from the ion source 151 under atmospheric pressure, and thus the second differential evacuation unit 102 is more likely to be contaminated than an analysis unit 103 having a high degree of vacuum. When an electrode of the ion guide 130 is contaminated, charge up occurs, which results in a decrease in the sensitivity of the mass spectrometer 100. In view of this, the ion guide 130 is configured to be less susceptible to contamination than the ion optical system installed in the analysis unit 103. The ions having been caused to converge by the ion guide 130 pass an aperture 123 and are introduced into the analysis unit 103 in which a quadrupole mass filter 140 is installed. The quadrupole mass filter 140 separates the ions according to their mass-to-charge ratio. The analysis unit 103 is maintained at a pressure of 1 E-3 Pa or less by evacuation by a pump 113. The ions having passed the quadrupole mass filter 140 are detected by a detector 152. As the detector 152, an electron multiplier tube or a detector in which a scintillator and a photomultiplier tube are combined is typically used.

The voltage control device 200, the DC power sources 301, 303, the RF power sources 302, and dielectrics 153 will be described later.

<Quadrupole Mass Filter 140>

Figure 2A:
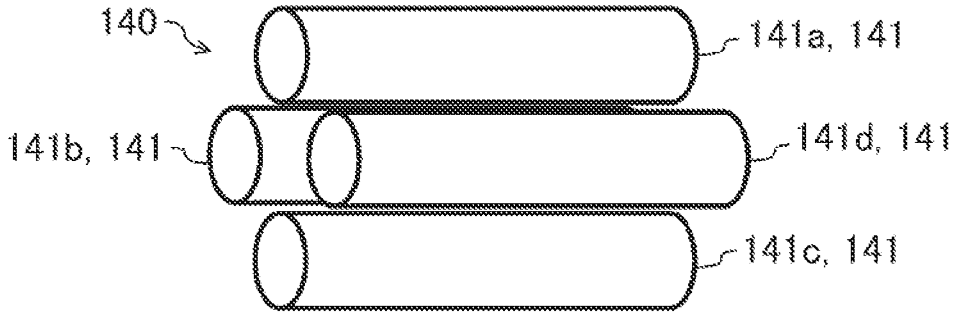
FIG. 2A is a first diagram illustrating a configuration of a quadrupole mass filter.
Figure 2B:
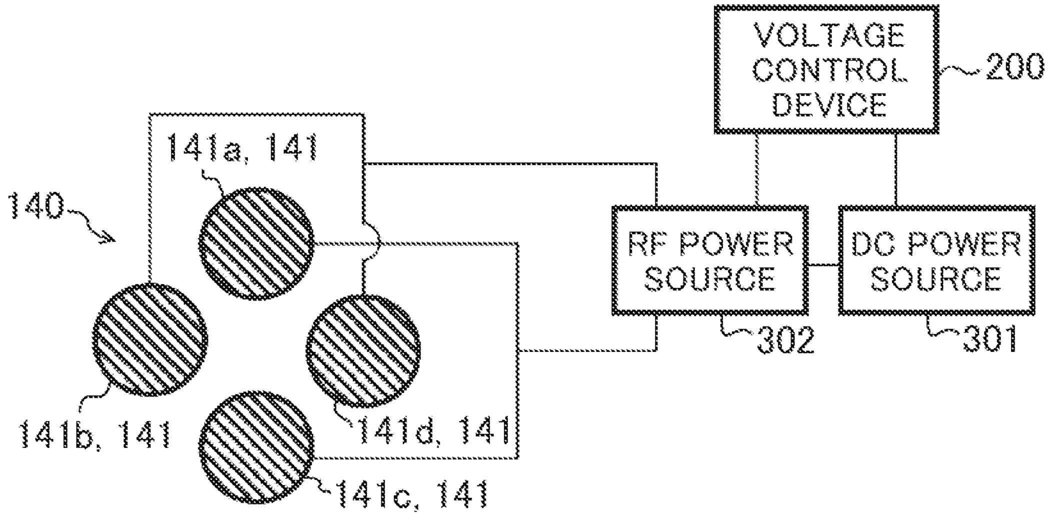
FIG. 2B is a second diagram illustrating a configuration of the quadrupole mass filter.

FIGS. 2A and 2B are diagrams illustrating a configuration of the quadrupole mass filter 140.

As illustrated in FIGS. 2A and 2B, the quadrupole mass filter 140 includes four quadrupole rod electrodes 141 (141*a* to 141*d*). A high frequency voltage (hereinafter referred to as RF voltage) and an electrostatic voltage (hereinafter referred to as DC voltage) are applied to the quadrupole rod electrodes 141 such that the adjacent quadrupole rod electrodes 141 are applied with voltages having opposite phases and the facing quadrupole rod electrodes 141 are applied with voltages having the same phase. The RF voltage is an alternating-current voltage generated by the RF power source 302 controlled by the voltage control device 200. That is, the RF voltages of opposite phases are applied between the pair of quadrupole rod electrodes 141*a* and 141*c* and the pair of quadrupole rod electrodes 141*b* and 141*d*.

The DC voltage is a voltage generated by the DC power source 301 controlled by the voltage control device 200. When the DC voltage applied to the quadrupole rod electrodes 141*a* and 141*c* is VDC1, the DC voltage applied to the quadrupole rod electrodes 141*b* and 141*d* is −VDC1. The RF voltage and the DC voltage to be applied are referred to as a quadrupole RF voltage and a quadrupole DC voltage, respectively, as appropriate. The quadrupole RF voltage typically has a voltage amplitude of several 100 V to several kV and a frequency of about 500 kHz to 2 MHz. The quadrupole DC voltage has a voltage value of about several 10 V to several 100 V.

Figure 3:
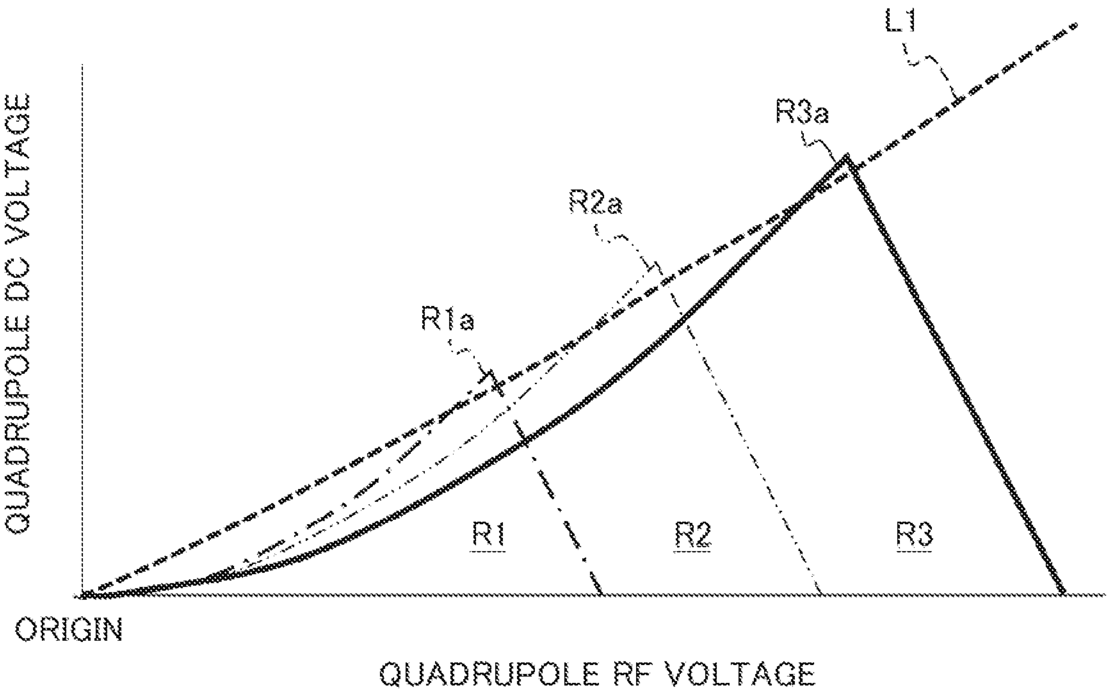
FIG. 3 is a diagram illustrating a stable region in the quadrupole mass filter.

An operation of the quadrupole mass filter 140 will be described. The m/z range of ions capable of stable orbital motion in the quadrupole mass filter 140 depends on the amplitude of the quadrupole RF voltage and the value of the quadrupole DC voltage. Only the ions present inside stable regions R1 to R3 illustrated in FIG. 3 can pass the quadrupole mass filter 140. The stable region R1 is a region surrounded by a line R1*a*, the stable region R2 is a region surrounded by a line R2*a*, and the stable region R3 is a region surrounded by a line R3*a*. The stable regions R1 to R3 are different per m/z of ions and are present in the order of ions having a small m/z to ions having a large m/z in the relation illustrated in FIG. 3. That is, the stable region R1 is a stable region of ions having a certain m/z. Similarly, the stable region R2 is a stable region of ions having an m/z different from the m/z of the ions in the stable region R1, and the stable region R3 is a stable region of ions having an m/z different from the m/z of the ions in the stable regions R1 and R2.

By setting the quadrupole RF voltage and the quadrupole DC voltage in the vicinity of one of the vertexes of the stable regions R1 to R3, it is possible to cause only the ions having the m/z corresponding to the stable region can pass. A mass spectrum can be obtained by scanning the quadrupole RF voltage while maintaining the relation between the quadrupole RF voltage and the quadrupole DC voltage so as to trace near the vertexes of the stable regions R1 to R3 of ions with each m/z as in the scan line LI illustrated in FIG. 3. That is, ions with a specific m/iz can be detected.

<Ion Guide 130>

FIGS. 4A to 4D are diagrams illustrating the configurations of the ion guide 130 in the present embodiment.

Figure 4A:
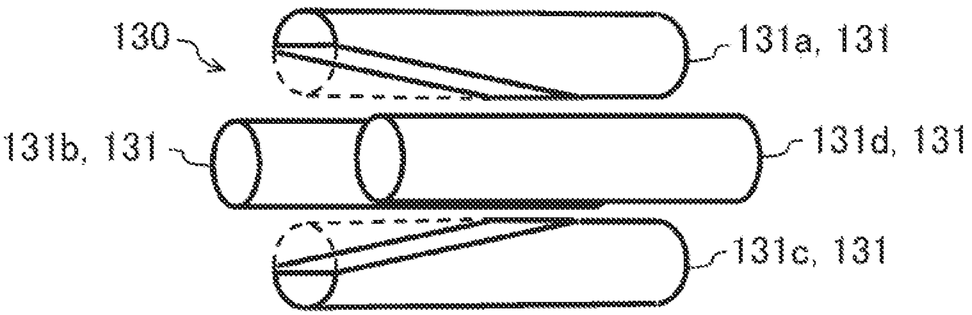
FIG. 4A is a first diagram illustrating a configuration of an ion guide in the present embodiment.
Figure 4B:
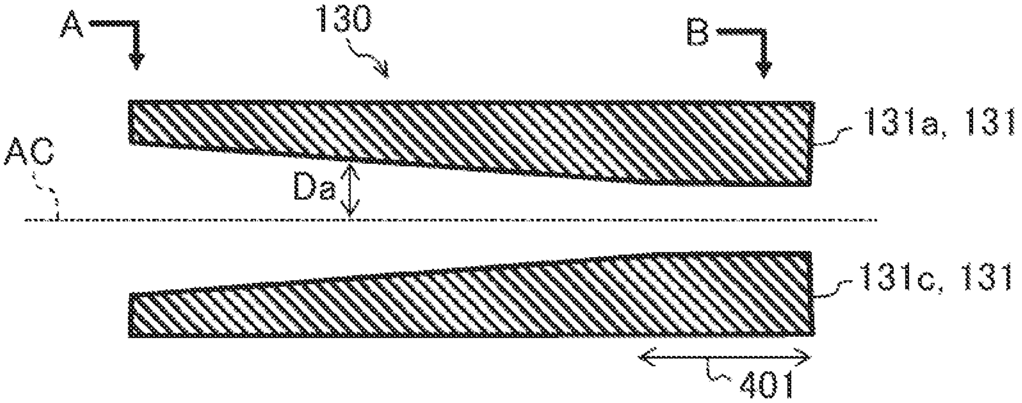
FIG. 4B is a second diagram illustrating a configuration of the ion guide in the present embodiment.

As illustrated in FIGS. 4A to 4D, the ion guide 130 includes four ion guide rod electrodes 131 (131*a* to 131*d*). As illustrated in FIGS. 4A to 4D, of the ion guide rod electrodes 131, a predetermined pair (ion guide rod electrodes 131*a*, 131*c*) facing each other have a shape in which part of a cylinder is cut obliquely from the cylinder to the bottom surface. As illustrated in FIG. 4B, the ion guide rod electrodes 131*a*, 131*c* are disposed such that the cut surfaces face a center axis AC of the ion guide 130. The other pair (ion guide rod electrodes 131*b*. 131*d*) have a cylindrical shape.

Figure 4C:
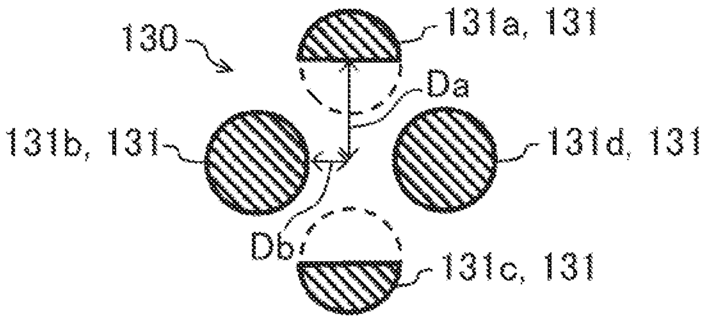
FIG. 4C is the third diagram illustrating a configuration of the ion guide in the present embodiment.
Figure 4D:
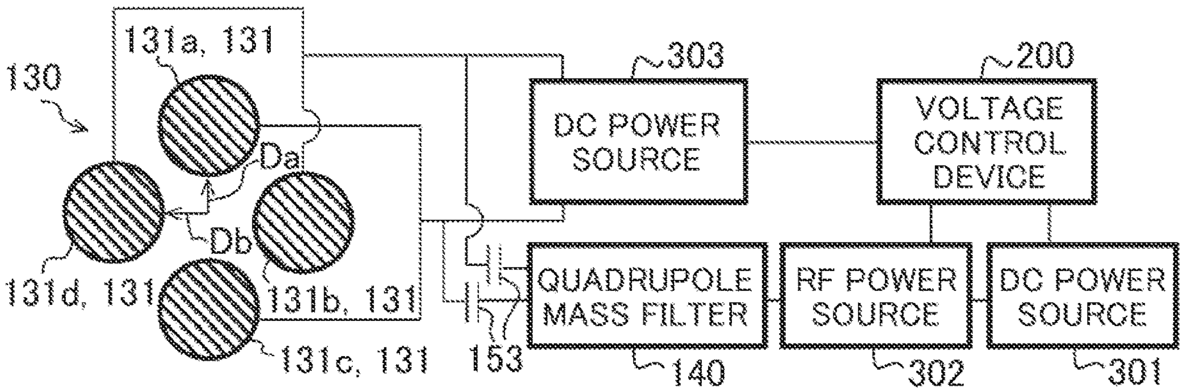
FIG. 4D is a fourth diagram illustrating a configuration of the ion guide in the present embodiment.

FIG. 4B is an axial sectional view of the ion guide 130. FIG. 4C is a radial sectional view (sectional view taken along the line A-A in FIG. 4B) viewed from the inlet of the ion guide 130. FIG. 4D is a radial sectional view (sectional view taken along the line B-B in FIG. 4B) viewed from the outlet of the ion guide 130.

As illustrated in FIG. 4C, in a radial section at the inlet of the ion guide 130, a distance Da is longer than a distance db. The distance Da is a distance between the center axis AC of the ion guide 130 (see FIG. 4B) and the lower end of the ion guide rod electrode 131*a* (or the upper end of the ion guide rod electrode 131*c*). The distance db is a distance between the center axis AC of the ion guide 130 (see FIG. 4B) and the inner end of the ion guide rod electrode 131*b* (or the inner end of the ion guide rod electrode 131*d*). The difference between the distance Da and the distance db decreases from the inlet of the ion guide 130 toward the outlet of the ion guide 130. As illustrated in FIG. 4D, the distance Da and the distance db become equal at the outlet of the ion guide 130.

The RF power source 302 applies RF voltages of the same phase to the predetermined ion guide rod electrodes 131*a*, 131*c* facing each other. The RF power source 302 applies, to the other ion guide rod electrodes 131B. 131*d* facing each other, RF voltages of a phase opposite to the phase of the voltages applied to the ion guide rod electrodes 131*a*, 131*c*. The phases of the RF voltages to be applied are controlled by the voltage control device 200 controlling the RF power source 302. The RF voltages applied to the ion guide 130 have an amplitude of 10 V to 5000 V and a frequency of about 500 kHz to 2 MHz. The amplitude of the RF voltage applied to the ion guide 130 and the amplitude of the RF voltage applied to the quadrupole mass filter 140 are different depending on the presence of the dielectrics 153.

As described above, the RF voltages are supplied from the RF power source 302, controlled by the voltage control device 200, to the quadrupole rod electrodes 141 (see FIGS. 2A and 2B) of the quadrupole mass filter 140. The voltages are supplied from the quadrupole rod electrodes 141 to the ion guide rod electrodes 131 of the ion guide 130 through the dielectrics 153 such as capacitors. Such a configuration reduces the number of power sources as compared with a configuration in which an RF voltage is supplied separately to the ion guide 130 and to the quadrupole mass filter 140, and thus the mass spectrometry system 1 can be made inexpensive.

The ratio α between the amplitude V of the RF voltage applied to the ion guide 130 and the amplitude $V_0$ of the RF voltage applied to the quadrupole mass filter 140 is given by the following Formula (1-1) or Formula (1-2).

[Mathematical Formula 1]

$$\alpha = \frac{V}{V_0} = \frac{R}{R + \frac{1}{C_1\omega}} \tag{1-1}$$

$$\alpha = \frac{V}{V_0} = \frac{R + \frac{1}{C_2\omega}}{R + \frac{1}{C_1\omega} + \frac{1}{C_2\omega}} \tag{1-2}$$

$C_1$ is the capacitance of the dielectrics 153, $C_2$ is the capacitance of the ion guide rod electrodes 131, R is the resistance between the ion guide rod electrodes 131 and the DC power source 303, and to ω is the frequency of the RF voltage.

In addition to the RF voltage, a DC voltage is applied to the ion guide rod electrodes 131. As illustrated in FIG. 4D, the DC power source 303 controlled by the voltage control device 200 supplies the DC voltage to the ion guide rod electrodes 131. As the ion guide 130 and the quadrupole mass filter 140 are separated by the dielectrics 153, different DC voltages can be applied. That is, due to the presence of the dielectrics 153, the DC voltage applied from the DC power source 301 to the quadrupole mass filter 140 does not affect the ion guide 130. The RF voltage applied to each of the ion guide rod electrodes 131 is offset by the DC voltage applied by the DC power source 303.

When the DC voltage applied to the pair of ion guide rod electrodes 131*a*, 131*c* is +VDC, the DC voltage applied to the pair of ion guide rod electrodes 131*b*, 131*d* is −VDC. The difference between the DC voltage applied to the pair of ion guide rod electrodes 131*a*, 131*c* and the DC voltage applied to the pair of ion guide rod electrodes 131*b*, 131*d* is referred to as an acceleration voltage, and the average of the voltages is referred to as an offset voltage. When the DC voltage applied by the DC power source 303 is VDC, the acceleration voltage is 2 VDC. Hereinafter, the RF voltage applied to each of the ion guide rod electrodes 131 and the quadrupole rod electrodes 141 is assumed to be offset by the DC voltage.

As described above, the distance Da and the distance db are equal to each other in the vicinity of the outlet of the ion guide 130. An axial electric field is not formed at a place where the distance Da and the distance db are equal to each other. The axial electric field is an electric field generated on the center axis AC by an acceleration voltage applied to the ion guide rod electrode 131.

That is, as illustrated in FIG. 4B, a cooling section 401, in which the distance Da and the distance db are equal to each other and no axial electric field is formed, is provided in a section of about 0.5 cm to 5 cm from the vicinity of the outlet of the ion guide 130. In the cooling section 401, no axial electric field is formed, and since the ion guide rod electrodes 131 have the same distance from the center axis AC, the RF voltage also becomes zero at the center axis AC. Thus, the spatial distribution and the kinetic energy distribution of ions can be efficiently caused to converge.

The ion guide 130 illustrated in FIGS. 4A to 4D has a small number of components, and the ion guide rod electrodes 131 have a cylindrical shape or a simple shape obtained by cutting out part of the cylindrical shape. The ion guide 130 and the ion guide rod electrodes 131 thus can be easily processed and manufactured at low cost. As described above, contamination of the electrode surface of the ion guide 130 by droplets and contaminants results in a decrease in the sensitivity of the mass spectrometer 100 due to charge up caused by the contamination. However, the ion guide 130 illustrated in FIGS. 4A to 4D also has an advantage of being resistant to contamination. The ion guide 130 illustrated in FIGS. 4A to 4D has no ion guide rod electrodes 131 on the path of the airflow flowing along the center axis AC. Thus, droplets and the like that cause contamination are less likely to hit the ion guide rod electrodes 131, and thus the ion guide 130 is resistant to contamination. The ion guide 130 is resistant to contamination also because the ion guide rod electrodes 131 have a large surface area and the electric field is hardly affected even when part of the electrodes is contaminated.

<Relation Between Distance in Ion Guide 130 and Voltage at Center Axis AC>

Figure 5:
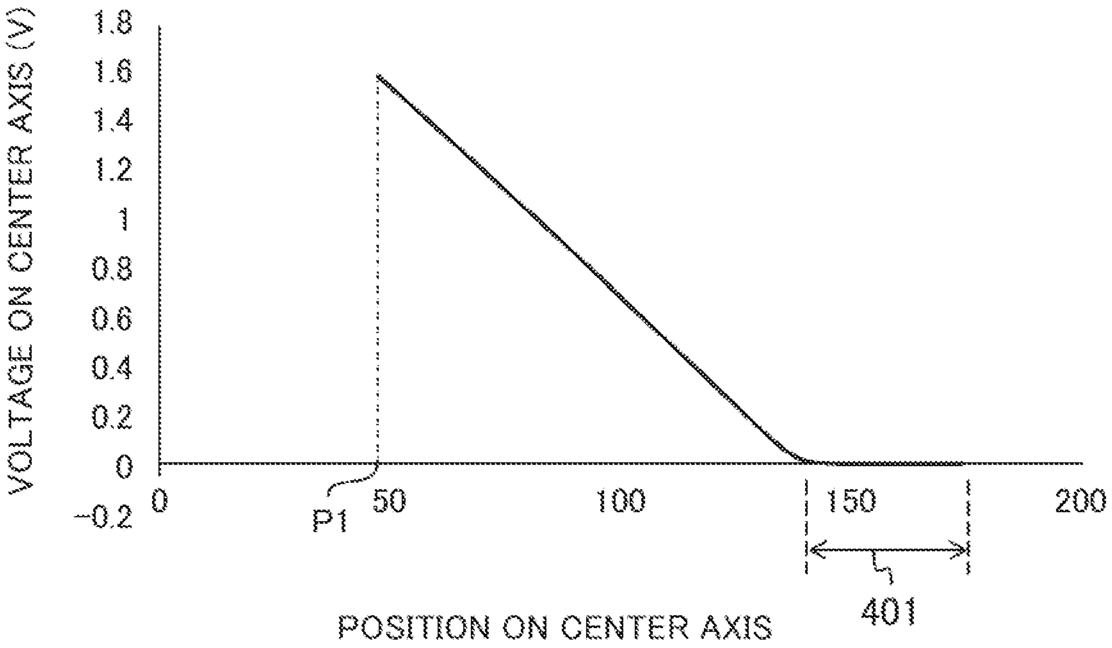
FIG. 5 is a graph illustrating a relation between the distance and the voltage at the center axis in the ion guide obtained by a simulation.

FIG. 5 is a graph illustrating a relation between the distance in the ion guide 130 and the voltage at the center axis AC, obtained by a simulation. The voltage at the center axis AC is a voltage defined by an axial electric field. Thus, generally, the voltage at the center axis AC does not match the acceleration voltage.

In FIG. 5, the horizontal axis represents the position along the center axis AC (position on the center axis) (that is, the distance in the ion guide 130) (unit: cm), and the vertical axis represents the voltage at the center axis AC (voltage on the center axis). In the horizontal axis, 0 indicates the position of the ion source 151. P1 indicates the inlet of the ion guide 130, and reference sign 401 indicates the cooling section.

The difference between the distance Da and the distance db, illustrated in FIGS. 4C and 4D, is largest at the inlet of the ion guide 130. That is, the voltage applied to the center axis AC is also highest at the inlet of the ion guide 130. As described above, the difference between the distance Da and the distance db decreases as the distance from the inlet of the ion guide 130 increases. Therefore, the voltage applied to the center axis AC gradually decreases as the distance from the inlet of the ion guide 130 increases, and becomes zero in the cooling section 401, located in the vicinity of the outlet of the ion guide 130. In this manner, an axial electric field that continuously accelerates or decelerates ions is generated on the center axis AC by applying an acceleration voltage to the ion guide 130 illustrated in FIGS. 4A to 4D.

The ion guide 130 cools the kinetic energy of the ions by collision with residual gas molecules to cause the ions to converge. The kinetic energy in the direction of the center axis AC is also cooled by collision with residual gas molecules. When the acceleration voltage is zero, the ions temporarily stay inside the ion guide 130 and then pass the ion guide 130 by being pushed out by electrical repulsion with ions newly introduced from the inlet of the ion guide 130. Thus, when the applied acceleration voltage is zero, it takes about several milliseconds to several hundred milliseconds for ions to pass the ion guide 130.

When the acceleration voltage is not zero, the moving speed of the ions in the ion guide 130 is given by the following Formula (2).

$$V=KE \tag{2}$$

K is ion mobility, and E is an axial electric field.

Figure 6:
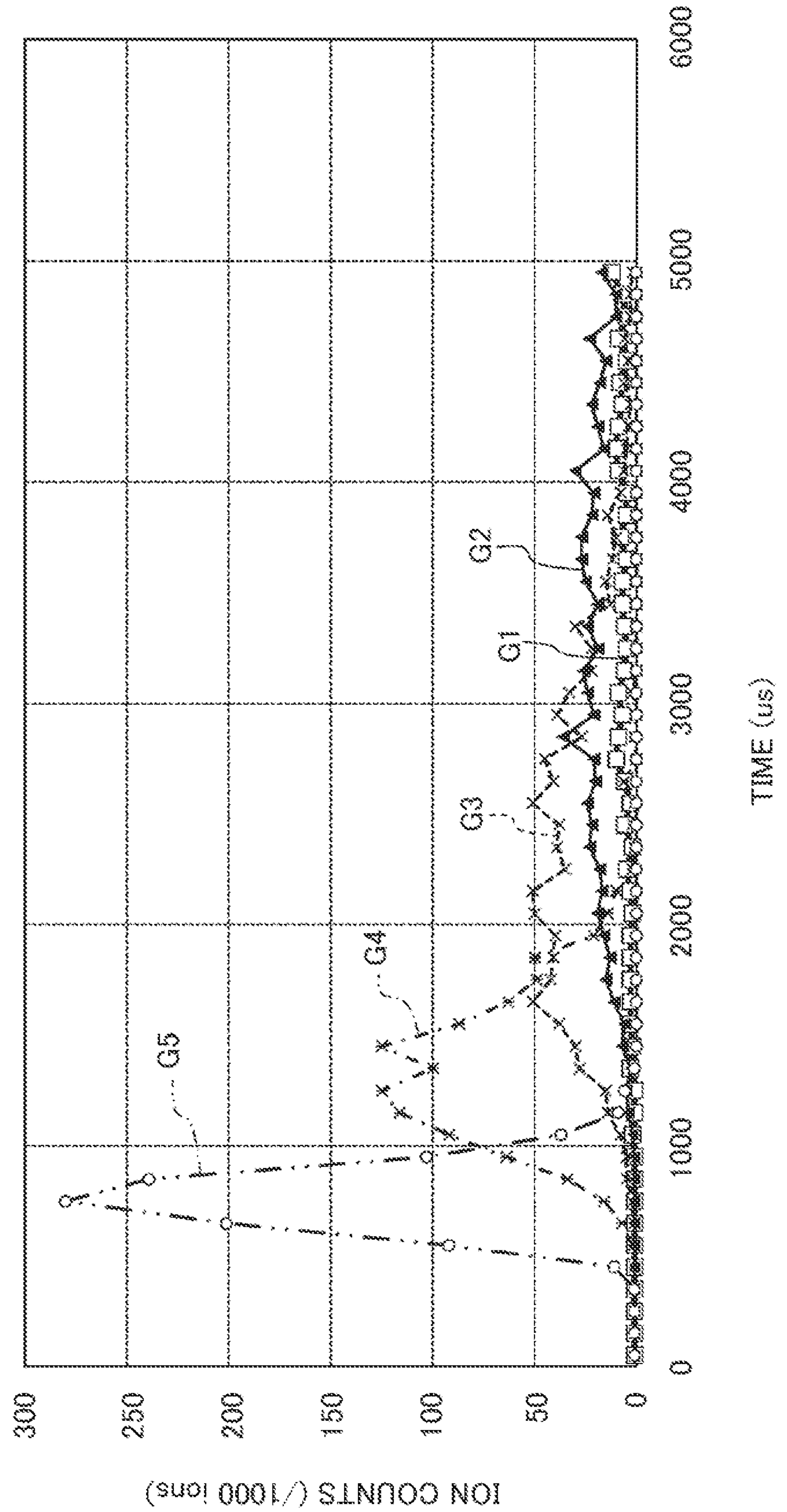
FIG. 6 is a graph illustrating a relation between the ion guide passing time and the ion amount of ions, which is obtained by a simulation.

FIG. 6 is a graph illustrating a relation between the ion guide passing time of ions and the ion amount obtained by a simulation.

In FIG. 6, the horizontal axis represents the ion guide passing time (Time), and the vertical axis represents the ion amount (ion Counts).

Reference sign G1 represents a case where an acceleration voltage of 1 V is applied, reference sign G2 represents a case where an acceleration voltage of 3 V is applied, and reference sign G3 represents a case where an acceleration voltage of 5 V is applied. Reference sign G4 represents a case where an acceleration voltage of 10 V is applied, and reference sign G5 represents a case where an acceleration voltage of 15 V is applied.

From FIG. 6, it can be seen that the distribution of the ion amount concentrates in a shorter ion guide passing time as a higher acceleration voltage is applied. The larger the acceleration voltage and thus the stronger the axial electric field, the faster the moving speed of ions and thus the shorter the time for the ions to pass the ion guide 130. The ion mobility K is approximately given by the following Formula (3).

[Mathematical Formula 2]

$$K = \frac{3}{16}\sqrt{\frac{2\pi}{\mu kT}}\frac{Z}{n\sigma} \tag{3}$$

Here, σ is a collisional cross section of ions, k is the Boltzmann constant, n is a density of gas molecules, Z is a charge of ions, μ is a reduced mass of ions, and T is an absolute temperature. The smaller the collisional cross section σ, the faster the moving speed of ions and thus the shorter the time for the ions to pass the ion guide 130. The collisional cross section a depends on the size of ions. The collisional cross section of ions having a higher m/z typically tends to be larger.

Figure 7:
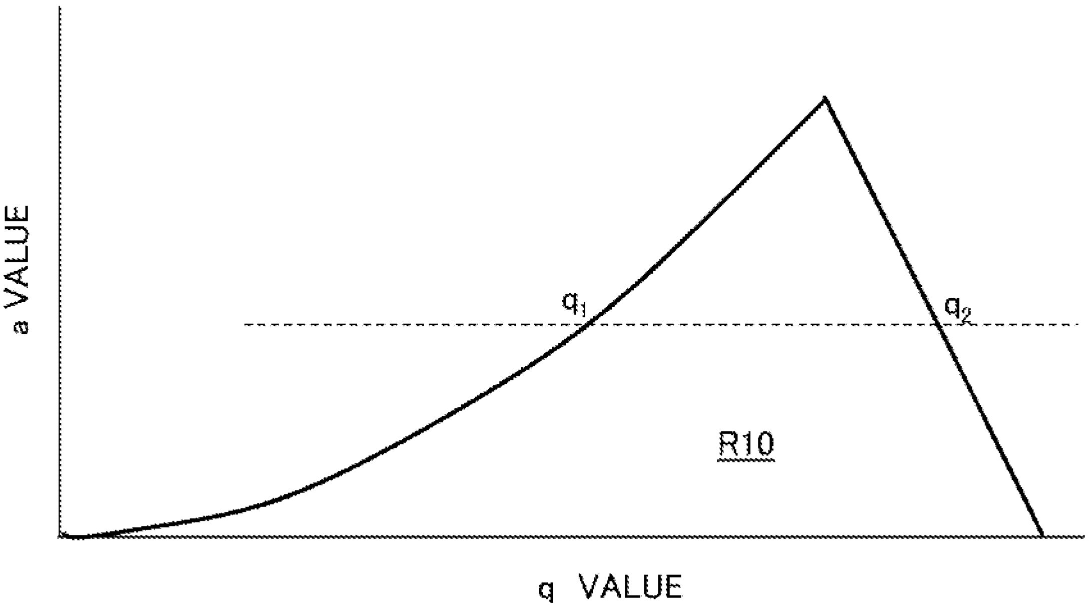
FIG. 7 illustrates a stable region in the ion guide with the horizontal axis representing the q value and with the vertical axis representing the a value.

FIG. 7 illustrates a stable region R10 in the ion guide 130 with the horizontal axis representing a q value and with the vertical axis representing an a value. The a value and the q value are given by the following Formulas (4) and (5), respectively.

[Mathematical Formula 3]

$$q = \frac{4eZV}{mr_0^2\Omega^2} \tag{4}$$

[Mathematical Formula 4]

$$a = \frac{8eZU}{mr_0^2\Omega^2} \tag{5}$$

Here, e is an elementary charge, Z is a charge of ions, m is a mass of ions, is an angular frequency of the RF voltage applied to the ion guide 130, V is an amplitude of the RF voltage applied to the ion guide 130, and r0 is an inscribed circle range of the ion guide 130. U is the value of the DC voltage applied to the ion guide rod electrodes 131, and thus the acceleration voltage is 2 U.

Ions capable of stable orbital motion in the ion guide 130 are limited to the ions in the region of the stable region R10 in FIG. 7, and the ions outside the stable region R10 are ejected from the ion guide 130. In the configuration in which the RF voltage of the ion guide 130 depends on the voltage of the quadrupole mass filter 140 as illustrated in FIGS. 1, 2A, and 2B, the m/z range of the ions that can pass the ion guide 130 is expressed by the following Formula (6) using m', which is the m/z of ions to be measured by the mass spectrometer 100, and the ratio α of the amplitude of the RF voltage of the quadrupole mass filter 140 and the amplitude of the RF voltage of the ion guide 130, where $q_1$ and $q_2$ are the ends of the stable region R10 when the acceleration voltage is applied.

[Mathematical Formula 5]

$$\alpha\frac{q'}{q_2}\frac{r_0'^2}{r_0^2}m' < m' < \alpha\frac{q'}{q_1}\frac{r_0'^2}{r_0^2}m' \quad (6)$$

Here, $r_0$ is an inscribed circle radius of the ion guide 130, $r'_0$ is an inscribed circle radius of the quadrupole mass filter 140, and q' is a q value of ions to be measured by the mass spectrometer 100, which is typically 0.7.

As shown in Formula (6), the m/z range of ions that can pass the ion guide 130 changes depending on the m/z of ions to be measured by the mass spectrometer 100.

<Ion Signal Amount During Changing m/z>

Figure 8:
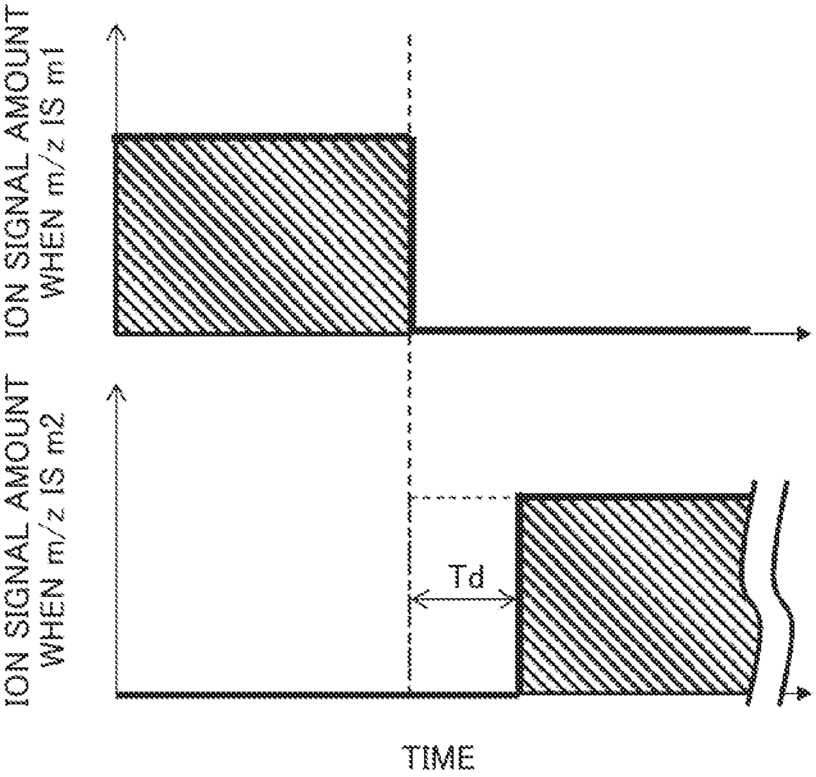
FIG. 8 is a diagram illustrating an image of the ion signal amount when m/z is changed from m1 to m2.

Now we consider the operation of changing m/z to be measured by the mass spectrometer 100 from m1 to m2, with reference to FIG. 8.

FIG. 8 is a diagram illustrating an image of the ion signal amount when the m/z is changed from m1 to m2.

In FIG. 8, the upper part represents the ion signal amount when the m/z is m1, the lower part represents the ion signal amount when the m/z is m2, the horizontal axis represents the time in the upper and lower drawings, and the vertical axis represents the ion signal amount.

A description is given of a case where ions with an m/z of m1 are measured by the mass spectrometer 100, with reference to the upper part. The description is given of a case, in such a condition, where ions with an m/z of m2 are outside the stable region R10 (see FIG. 7) in the ion guide 130 having the ion mobility represented by Formula (2). While the mass spectrometer 100 is measuring ions with an m/z of m1, ions with an m/z of m2 are ejected from the inside of the ion guide 130. Thus, as schematically illustrated in the lower part of FIG. 8, ions with an m/z of m2 are not observed immediately after the m/z of ions to be measured by the mass spectrometer 100 is switched to m2. Then, the ion signal with an m/z of m2 rises after a delay time Td. This delay time Td is the time required for ions with an m/z m2 to pass the ion guide 130 and reach the quadrupole mass filter 140. To shorten the delay time Td and reduce the loss of the ion signal (time lag at the time of changing), it is necessary to set the acceleration voltage high to increase the moving speed of the ions in the ion guide 130.

<Control Method>

Figure 9:
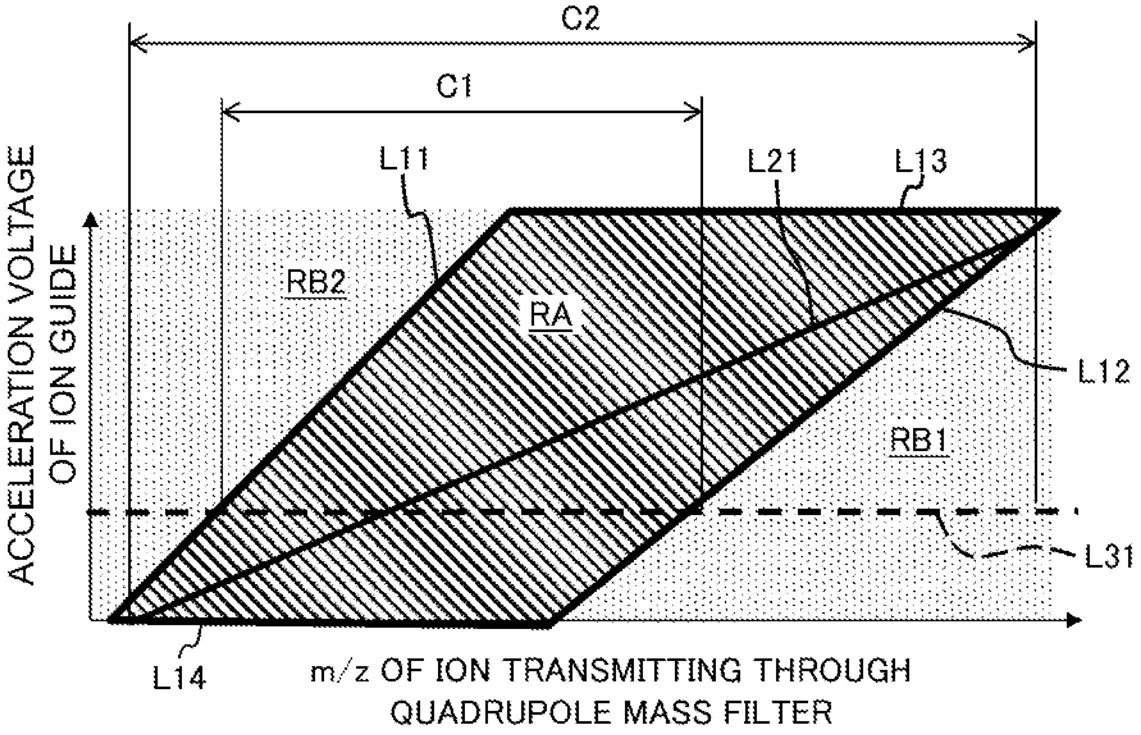
FIG. 9 is a diagram illustrating a control method for a mass spectrometry system according to the first embodiment.

FIG. 9 is a diagram illustrating a control method for the mass spectrometry system 1 according to the first embodiment.

In the control region RA indicated by the parallelogram, the left line L11 is defined by q1 in Formula (6), and the right line L12 is defined by ion mobility. The upper side L13 of the control region RA is defined by the upper limit of the acceleration voltage of the mass spectrometer 100. The lower side L14 of the control region RA indicates that the acceleration voltage is zero.

The region RB1 in FIG. 9 is a region where the time from when the m/z of ions to be measured by the mass spectrometer 100 is changed to when the ions reach the quadrupole mass filter 140 is long and thus the ion loss (time lag) is large at the time of changing the m/z. According to Formulae (2) and (3), a bulkier ion with a higher m/z has a slower moving speed when accelerated in the same electric field, and thus a higher acceleration voltage is required to reduce the loss (time lag) of the ion signal. Here, q1 is the lower limit value of the stable region R10 where ions stably pass in the ion guide 130 illustrated in FIG. 7.

The region RB2 in FIG. 9 is a region where ions to be measured by the mass spectrometer 100 are outside the stable region R10 (see FIG. 7) in the ion guide 130 and thus ions are not observed. As can be seen from FIG. 7, ions having a lower m/z are more likely to be outside the stable region R10 at a low acceleration voltage.

Conventionally, measurement is performed with a constant acceleration voltage as indicated by a line L31 and, when ions are changed, measurement is performed with a constant acceleration voltage that is suitable for the changed ions. At a constant acceleration voltage, the acceleration voltage at which low m/z ions can stably pass the ion guide 130 and the acceleration voltage at which high m/z ions can pass without loss (time lag) at the time of changing the m/z are not compatible. Thus, the m % z range of the ions that can pass the ion guide 130 without loss (time lag) is limited to the range illustrated in FIG. 7, that is, the range indicated by reference sign C1 in FIG. 9.

The control line L21 in FIG. 9 is an example of control of the acceleration voltage in the present embodiment. The voltage control device 200 controls the acceleration voltage as indicated by the control line 121. The control line 121 corresponds to the scan line 1 in FIG. 3.

That is, when the m/z of ions to be measured by the mass spectrometer 100 is low, the voltage control device 200 controls the acceleration voltage to a low value. When the m/z of ions to be measured by the mass spectrometer 100 is high, the voltage control device 200 sets the acceleration voltage to a high value. Specifically, as indicated by the control line L21 in FIG. 9, it is desirable to control the acceleration voltage so as to be proportional to m/z. This causes the ions having the m/z and being to be measured by the mass spectrometer 100 to have such an a value in the ion guide 130 that the a value takes a constant value passing the stable region R10 (see FIG. 7).

The control of the acceleration voltage does not have to depend on the m/z like the control line L21 in FIG. 9. The relation between the acceleration voltage and the m/z may be such that the acceleration voltage and the m/z are within the control region RA and the acceleration voltage is increased as the m/z is increased. For example, the acceleration voltage may be changed, for example, in a stepwise manner, instead of being continuously changed as indicated by the control line L21 of FIG. 9. Alternatively, the voltage control device 200 may change the acceleration voltage linearly with a predetermined slope up to a predetermined m/z, and may change the acceleration voltage linearly with another slope in a region of m/z larger than the predetermined m/z.

As indicated by the control line L21 in FIG. 9, controlling the acceleration voltage so as to be proportional to the m/z causes ions with a low m/z to stably pass the ion guide 130 and ions with a high m/z to also pass the ion guide 130 without loss (time lag) at the time of changing the m/z. In this manner, using the control method of the present embodiment causes ions in a wide m/z range to pass without loss (time lag) as indicated by reference sign C2, as compared with the conventional control method using a constant acceleration voltage.

That is, the moving speed is increased by applying a high acceleration voltage to the ions having a large n/z and thus having a low moving speed (low ion mobility). As a result, at the time of changing the m/z, loss (time lag) can be reduced even when changing ion to an ion with a large m/z. In FIG. 9, the control line L21 has a region lower than the line L31 of the conventional control in a region with a low m/z. That is, in a region where the m/z is low, an acceleration voltage lower than that in the conventional control is applied. However, ions having a low m/z originally have high ion mobility and thus have a sufficient moving speed even at a low acceleration voltage. Thus, in a region where the m/z is low, application of an acceleration voltage lower than that in the conventional control does not cause any problems. That is, the larger the m/z, the more effective the present embodiment.

Second Embodiment

<Control Method>

A method for controlling the acceleration voltage in the second embodiment will be described with reference to FIG. 10.

Figure 10:
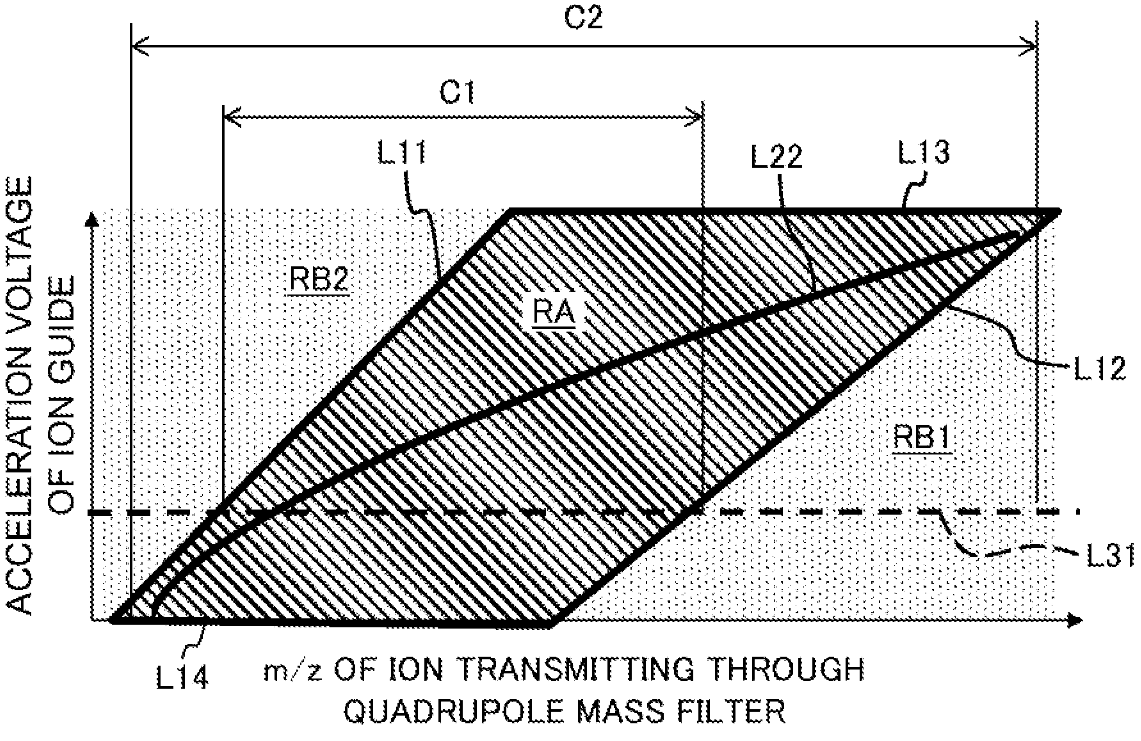
FIG. 10 is a diagram illustrating a control method for a mass spectrometry system according to a second embodiment.

FIG. 10 is a diagram illustrating a control method for the mass spectrometry system 1 according to the second embodiment. In FIG. 10, the same configuration as those in FIG. 9 are denoted by the same reference signs, and description thereof is omitted.

As the configuration of the mass spectrometer 100 of the second embodiment is the same as that illustrated in FIG. 1, the description thereof is omitted here.

When the residual gas molecular mass in the ion guide 130 is sufficiently small compared to the mass of the ions, the reduced mass p in Formula (3) can be approximated by the mass m of the ions. When it is assumed that the shape of the ions is substantially spherical and the density of the ions is uniform, the collisional cross section a of the ions in Formula (3) is proportional to two-third power of mass of the ions. When this approximation is used, the ion mobility K in Formula (3) is expressed by Formula (7) below.

[Mathematical Formula 6]

$$K = \frac{3}{16}\sqrt{\frac{2\pi}{kT}}\frac{Z}{nm^{\frac{5}{6}}} \tag{7}$$

In Formula (7), K represents the ion mobility as described above.

The voltage control device 200 obtains the acceleration voltage according to the relational expression of Formula (7). For example, when the length L of the ion guide 130 is sufficiently large with respect to the length of the cooling section 401, the relation between the time t for monovalent ions to pass the ion guide 130 and the acceleration voltage 2 U can be described as the following Formula (8) using K in Formula (7) and a proportional constant C uniquely determined by the structure of the ion guide.

[Mathematical Formula 7]

$$2U = CE = \frac{L}{Kt} = \frac{L}{t}\frac{16}{3}\left(\frac{2\pi}{kT}\right)^{-\frac{1}{2}}\frac{nm^{\frac{5}{6}}}{Z} \tag{8}$$

According to Formula (8), in the case of monovalent ions, controlling the acceleration voltage so as to be proportional to five-sixth power of the mass of ions makes it possible to cause ions with an m/z within a wide m/z range to pass the ion guide 130 at the time t. The control line L22 is the acceleration voltage control line obtained according to the relational expression of Formula (7).

In this manner, the influence of residual gas molecules in the ion guide 130 can be eliminated, so that ions can be controlled to pass the ion guide 130 in a substantially constant time. That is, the control method according to the second embodiment can control the time for ions to pass the ion guide 130 with higher accuracy.

Third Embodiment

Next, the third embodiment of the present invention will be described with reference to FIGS. 11 and 12.

<Mass Spectrometry System 1*a*>

Figure 11:
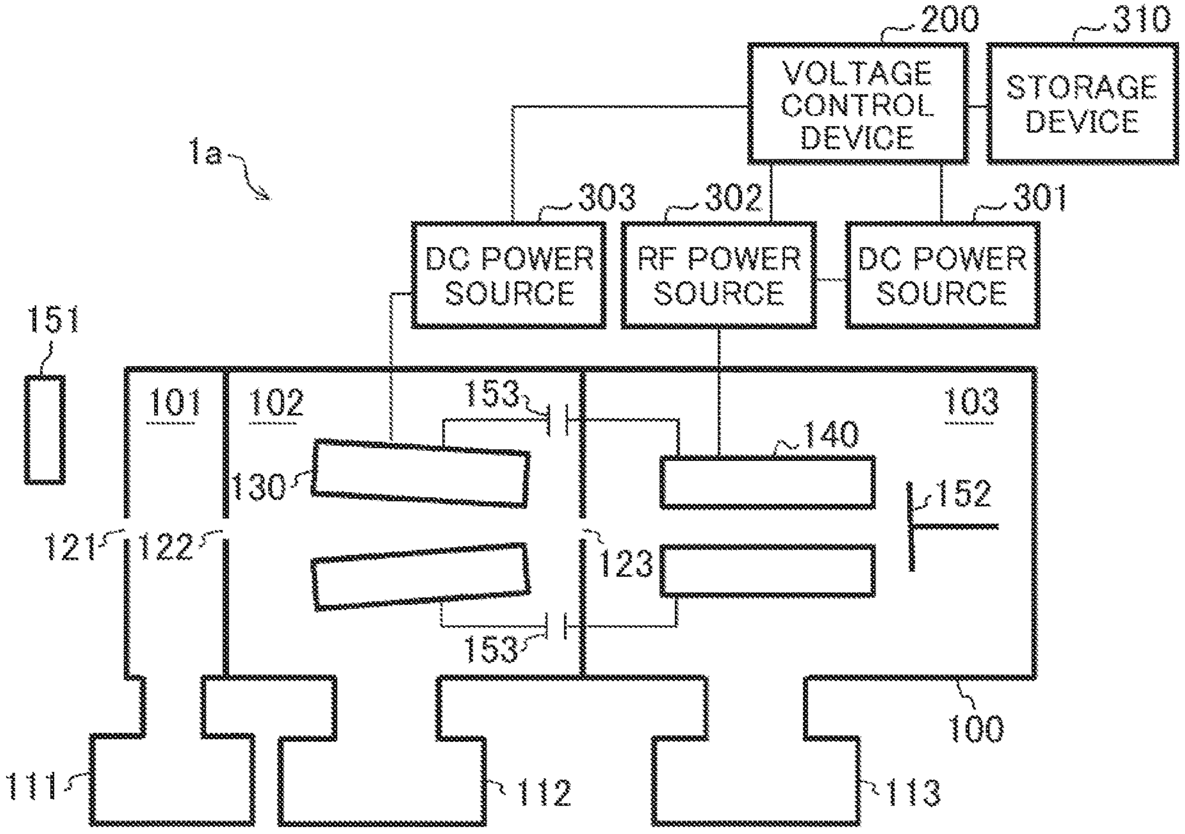
FIG. 11 is a configuration diagram of a mass spectrometry system according to a third embodiment.

FIG. 11 is a configuration diagram of a mass spectrometry system 1*a* according to the third embodiment.

The configuration of the mass spectrometry system 1*a* illustrated in FIG. 11 is different from the mass spectrometry system 1 illustrated in FIG. 1 in that the mass spectrometry system 1*a* includes a storage device 310 connected to the voltage control device 200. The storage device 310 holds a table of a relation between the acceleration voltage and the m/z. The table will be described later. The storage device 310 may be provided in a cloud or the like.

<Control Method>

Figure 12:
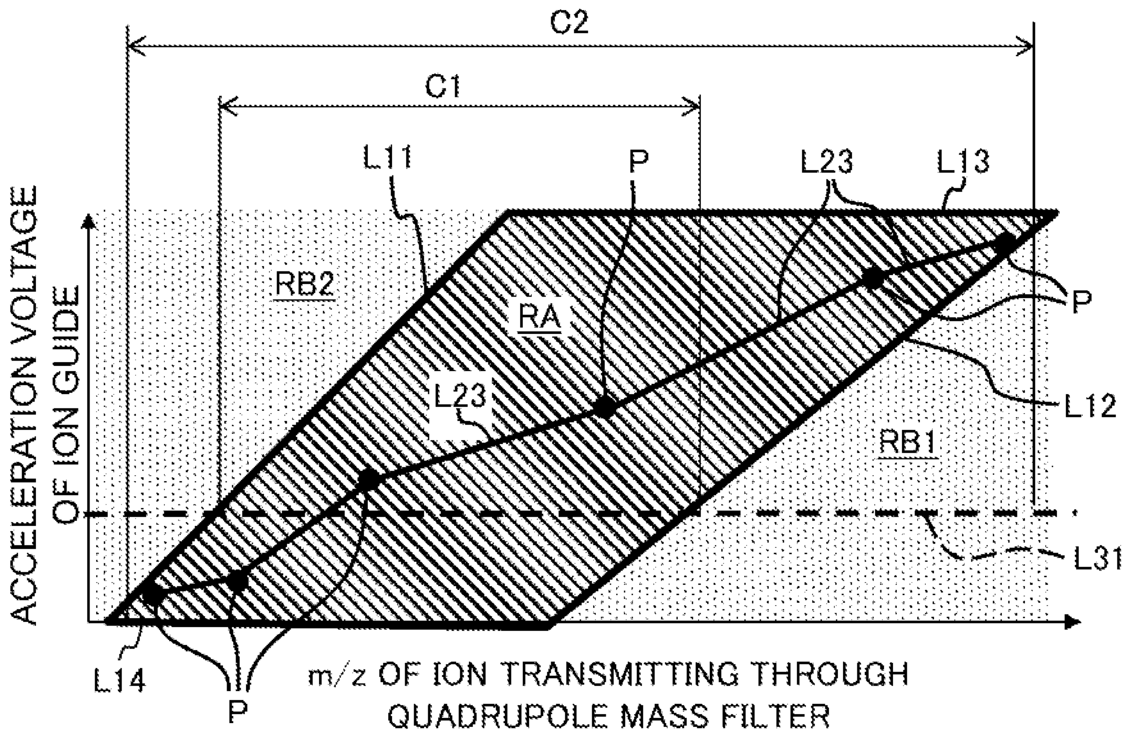
FIG. 12 is a diagram illustrating a control method for the mass spectrometry system according to the third embodiment.

FIG. 12 is a diagram illustrating a control method for the mass spectrometry system 1*a* according to the third embodiment.

Data points P represent a plot showing the relation between the acceleration voltage and the m/z measured in the past. The data points P can be experimentally determined by measuring ions at each n/z in advance such that the ion signal intensity at the time of changing the m/z is maxim/zed. The data points P are held as a table in the storage device 310.

A control line L23 between the data points P is generated by linear interpolation of the data points P. The voltage control device 200 controls the acceleration voltage according to the control line L23 illustrated in FIG. 12.

<Flowchart>

Figure 13:
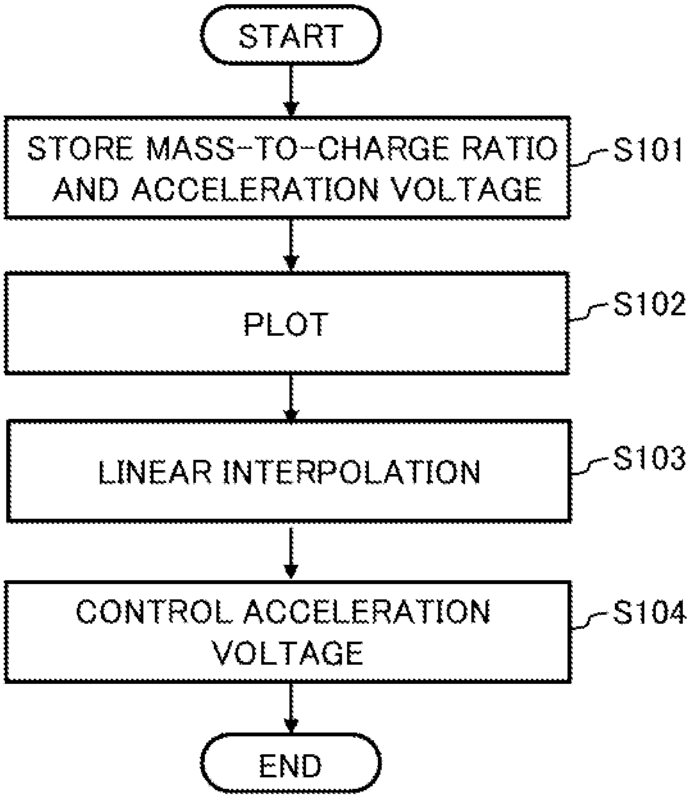
FIG. 13 is a flowchart illustrating a procedure of the control method for the mass spectrometry system according to the third embodiment.

FIG. 13 is a flowchart illustrating procedures of the control method for the mass spectrometry system 1*a* according to the third embodiment. Please refer to FIG. 12 as appropriate.

First, the mass spectrometer 100 performs a measurement of ions, and the voltage control device 200 stores the m/z and the acceleration voltage used in the measurement in the storage device 310 (S101).

Next, the voltage control device 200 plots the acceleration voltage and the m/z stored in the storage device 310 as data points P at coordinates as illustrated in FIG. 12 (S102).

Then, the voltage control device 200 obtains the control line L23 by linear interpolation (S103).

Thereafter, the voltage control device 200 controls the acceleration voltage according to the control line 123 (S104).

Strictly speaking, the ion mobility K depends not only on tnz but also on the structure of a molecule. Thus, by creating a table of the acceleration voltage and m/z for a sample to be measured or a structural compound similar to the sample and controlling the acceleration voltage, it is possible to control the acceleration voltage according to the actual situation. That is, the acceleration voltage can be controlled taking into consideration the structure of the molecule. As a result, the loss (time lag) of the ion signal when the m/z of ions to be measured by the mass spectrometer 100 is changed can be further reduced as compared with other embodiments.

Fourth Embodiment

Next, a fourth embodiment of the present invention will be described with reference to FIGS. 14A and 14B.

In the fourth embodiment, as the configuration of the mass spectrometry system 1 is the same as that illustrated in FIG. 1, illustration and description thereof are omitted here.

Figure 14A:
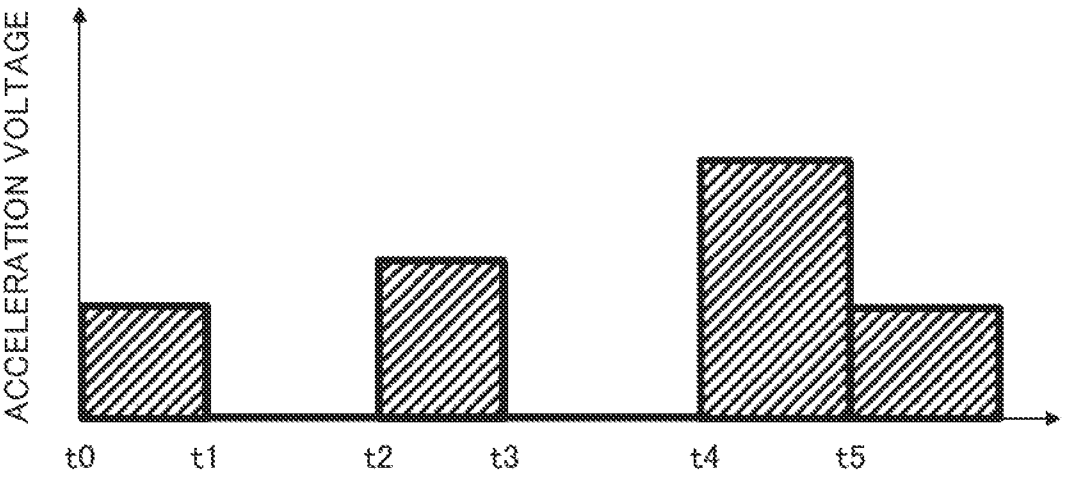
FIG. 14A is a diagram illustrating the temporal change of the acceleration voltage.

FIG. 14A is a diagram illustrating the temporal change of the acceleration voltage. FIG. 14B is a diagram illustrating the temporal change of m/z of the ions to be measured in the mass spectrometry system 1.

Figure 14B:
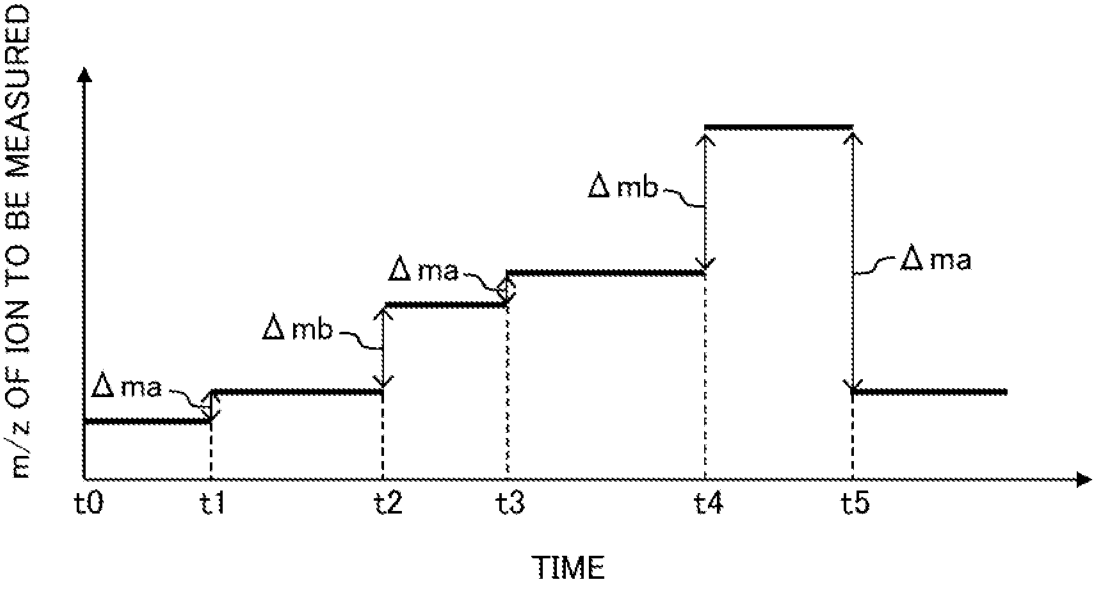
FIG. 14B is a diagram illustrating the temporal change of m/z of the ion measured in the mass spectrometry system.

In FIGS. 14A and 14B, the times t0 to t5 each indicate the same time.

The loss (time lag) of the ion signal when the m/z for the measurement by the mass spectrometer 100 is changed depends on the difference between the m/z of the ions with an m/z of m1 and the m/z of the ions with an m/z of m2, shown in FIG. 8. When the ions with an m/z of m2 can present stably in the ion guide 130 while measuring the ions with an m/z of m1, the delay time Td (see FIG. 8) becomes zero, and the loss (time lag) of the ion signal does not occur.

In a typical measurement using a quadrupole mass spectrometer as the mass spectrometer 100, various types of ions are measured by changing the m/z of ions to be measured by the mass spectrometer 100 at regular time intervals, as illustrated in FIG. 14B. In the fourth embodiment, when ions with an m/z of $m_n$ to be measured can pass the ion guide 130 stably under the measurement condition of ions with an m/z of $m_{n-1}$ measured in an immediately preceding measurement, that is, when the difference Δm ($=m_n-m_{n-1}$) from the m/z of the ions measured in the immediately preceding measurement is small (Δma in FIG. 14B), the control device sets the acceleration voltage to zero or a sufficiently low value as illustrated in FIG. 14A. When ions with an m/z of $m_n$ is to be measured and those ions cannot pass the ion guide 130 stably under the measurement condition under which ions with an m/z of $m_{n-1}$ are measured in the immediately preceding measurement, that is, when Δm is large (Δmb in FIG. 14B), an acceleration voltage according to the m/z is applied.

In short, when the difference (Δm) in the m/z is smaller than the predetermined value (Δma), the ions to be measured have already reached the vicinity of the outlet of the ion guide 130 by the previously applied acceleration voltage even without applying a new acceleration voltage. Thus, the ions can be measured without applying an acceleration voltage. In contrast, when the difference (Δm) in the m/z is larger than the predetermined value (Δmb), the ions to be measured cannot pass the ion guide 130 at the previously applied acceleration voltage. Therefore, a new acceleration voltage is applied.

When an acceleration voltage is applied, the distribution of ions in the radial direction in the vicinity of the outlet of the ion guide 130 expands, and the number of ions passing the aperture 123 decreases. However, in the fourth embodiment, since an acceleration voltage is not newly applied under the condition (Δma) where Δm is small, it is possible to reduce the expansion of the distribution of ions in the radial direction in the vicinity of the outlet of the ion guide 130. This configuration can realize highly sensitive measurement. By changing the order of the measurements so that Δm is as small as possible according to the m/z of ions to be measured, more ions can be measured with high sensitivity.

[Voltage Control Device 200]

Figure 15:
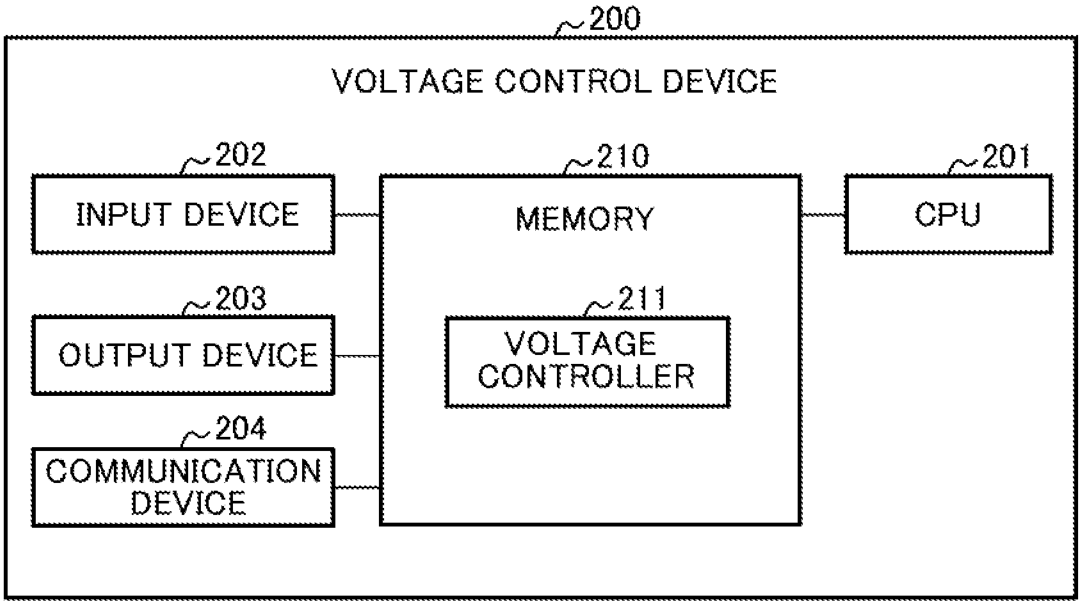
FIG. 15 is a functional block diagram illustrating a configuration of a voltage control device according to the present embodiment.

FIG. 15 is a functional block diagram illustrating a configuration of the voltage control device 200 according to the present embodiment.

The voltage control device 200 includes a memory 210, a central processing unit (CPU) 201, an input device 202 such as a keyboard or a mouse, an output device 203 such as a display, and a communication device 204 that communicates with the DC power sources 301, 303, the RF power source 302, and the storage device 310.

A program stored in a storage device (not illustrated) of the voltage control device 200 is loaded into the memory 210, and the CPU 201 executes the loaded program. This configuration embodies a voltage controller 211. The voltage controller 211 controls the acceleration voltage as illustrated in FIGS. 9, 10, 12, 13, and 14.

The present invention is not limited to the above-described embodiments but includes various modifications. For example, the above-described embodiments have been described in detail for easy understanding of the present invention, and the present invention is not necessarily limited to those having all the described configurations. A part of the configuration of a certain embodiment can be replaced with the configuration of another embodiment, and the configuration of a certain embodiment can be added to the configuration of another embodiment. A part of a configuration of each embodiment can be added to, deleted from, and replaced with a part of another configuration.

Some or all of the above-described configurations, functions, the voltage controller 211, the storage device 310, and the like may be realized by hardware, for example, by designing with an integrated circuit. As illustrated in FIG. 15, each of the above-described configurations, functions, and the like may be realized by software by a processor such as the CPU 201 interpreting and executing a program for realizing each function. Information such as a program, a table, or a file for realizing each function may be stored not only in a hard disk (HD) but also in a recording device such as a memory or a solid state drive (SSD), or a recording medium such as an integrated circuit (IC) card, a secure digital (SD) card, or a digital versatile disc (DVD).

In each embodiment, control lines and information lines considered to be necessary for description are illustrated, and not all control lines and information lines in a product are necessarily illustrated. In practice, it may be considered that almost all the configurations are connected to each other.

REFERENCE SIGNS LIST

1, 1*a* mass spectrometry system
100 mass spectrometer
130 ion guide
131 ion guide rod electrode
131*a*, 131*c* ion guide rod electrode (a pair of the ion guide rod electrodes)
140 quadrupole mass filter (mass filter)
151 ion source
152 detector
302 RF power source (power source)
303 DC power source (power source)
310 storage device
AC center axis
m/z mass-to-charge ratio L10 stable region
L11 line (lower limit value of stable region)
L12 line (ion mobility)
L13 upper side (upper limit value of acceleration voltage)
L14 lower side (acceleration voltage is zero)
L21 control line (acceleration voltage is controlled)
L22 control line (acceleration voltage is controlled)
L23 control line (control line obtained by linear interpolation)
P datum point (plot)
R10 stable region
RA control region
200 voltage control device (voltage controller)
211 voltage controller

The invention claimed is:

1. A control method for a mass spectrometer, comprising:
generating ions with an ion source;
causing the ions to converge with an ion guide disposed downstream of the ion source;
separating with a mass filter disposed downstream of the ion guide, according to a mass-to-charge ratio, the ions having been caused to converge by the ion guide; and
detecting with a detector disposed downstream of the mass filter the ions having been separated by the mass filter;
applying an AC voltage at least to the ion guide with a power source, the AC voltage being offset by a DC voltage;
controlling an acceleration voltage by controlling the power source, the acceleration voltage being the DC voltage, and
controlling the acceleration voltage so that the acceleration voltage is increased as the mass-to-charge ratio of the ions to be measured is increased within a control region, the control region being surrounded, in a coordinate having one coordinate axis representing the mass-to-charge ratio of the ions passing the ion guide and another coordinate axis representing the acceleration voltage applied to the ion guide, by a lower limit value of a stable region where the ions pass the ion guide stably, an ion mobility of the ions, an upper limit value of the acceleration voltage, and a value where the acceleration voltage is zero.

2. The control method for a mass spectrometer according to claim 1, further comprising:
controlling the acceleration voltage within the control region so that the acceleration voltage is proportional to the mass-to-charge ratio of the ions.

3. The control method for a mass spectrometer according to claim 1, further comprising:
controlling the acceleration voltage so as to be inversely proportional to five-sixth power of mass of the ions.

4. The control method for a mass spectrometer according to claim 1, further comprising:
storing, in a storage device, the acceleration voltages used in a measurement where the predetermined ions are measured plural times by the mass spectrometer and the mass-to-charge ratios of the predetermined ions measured;
plotting, in the coordinate, the acceleration voltages and the mass-to-charge ratios, stored in the storage device, in correspondence to each other;
calculating a control line obtained by performing linear interpolation between points plotted in the coordinate; and
controlling the acceleration voltage according to the calculated control line.

5. The control method for a mass spectrometer according to claim 1, further comprising, on a condition that
when a difference between a mass-to-charge ratio of a first ion to be subsequently measured by the mass spectrometer and a mass-to-charge ratio of a second ion measured immediately before the first ion is equal to or less than a predetermined value, not applying the acceleration voltage at a time of measuring the first ion.

6. A mass spectrometry system comprising:
a mass spectrometer comprising an ion source configured to generate ions, an ion guide disposed downstream of the ion source and configured to cause the ions to converge, a mass filter disposed downstream of the ion guide and configured to separate, according to a mass-to-charge ratio, the ions having been caused to converge by the ion guide, and a detector disposed downstream of the mass filter and configured to detect the ions having been separated by the mass filter;
a power source configured to apply an AC voltage at least to the ion guide, the AC voltage being offset by a DC voltage; and
a voltage controller configured to control an acceleration voltage by controlling the power source, the acceleration voltage being the DC voltage,
wherein the voltage controller is configured to control the acceleration voltage so that the acceleration voltage is increased as the mass-to-charge ratio of the ions to be measured is increased within a control region, the control region being surrounded, in a coordinate having one coordinate axis representing the mass-to-charge ratio of the ions passing the ion guide and another coordinate axis representing the acceleration voltage applied to the ion guide, by a lower limit value of a stable region where the ions pass the ion guide stably, an ion mobility of the ions, an upper limit value of the acceleration voltage, and a value where the acceleration voltage is zero.

7. The mass spectrometry system according to claim 6,
wherein the ion guide includes four pieces of ion guide rod electrodes,
wherein a distance between at least one pair of the ion guide rod electrodes forming the ion guide and a center axis of the ion guide varies depending on a position on the center axis, and
wherein the electrodes whose distance to the center axis of the ion guide vary each have a plane facing the center axis of the ion guide and the plane is flat.

8. A voltage control device in a mass spectrometry system comprising:
a mass spectrometer comprising an ion source configured to generate ions, an ion guide disposed downstream of the ion source and configured to cause the ions to converge, a mass filter disposed downstream of the ion guide and configured to separate, according to a mass-to-charge ratio, the ions having been caused to converge by the ion guide, and a detector disposed downstream of the mass filter and configured to detect the ions having been separated by the mass filter;
a power source configured to apply an AC voltage at least to the ion guide, the AC voltage being offset by a DC voltage;
wherein the voltage control device is configured to control an acceleration voltage by controlling the power source, the acceleration voltage being the DC voltage,
wherein the voltage control device is further configured to control the acceleration voltage so that the acceleration voltage is increased as the mass-to-charge ratio of the ions to be measured is increased within a control region, the control region being surrounded, in a coordinate having one coordinate axis representing the mass-to-charge ratio of the ions passing the ion guide and another coordinate axis representing the acceleration voltage applied to the ion guide, by a lower limit value of a stable region where the ions pass the ion guide stably, an ion mobility of the ions, an upper limit value of the acceleration voltage, and a value where the acceleration voltage is zero.

* * * * *